United States Patent [19]

Suginoya et al.

[11] Patent Number: 5,151,379
[45] Date of Patent: Sep. 29, 1992

[54] METHOD FOR MANUFACTURING A COLOR FILTER

[75] Inventors: Mitsuru Suginoya; Hitoshi Kamamori; Takakazu Fukuchi, all of Tokyo, Japan

[73] Assignee: Seiko Instruments Inc., Japan

[21] Appl. No.: 840,336

[22] Filed: Feb. 24, 1992

[30] Foreign Application Priority Data

Feb. 26, 1991 [JP] Japan ................................. 3-31071

[51] Int. Cl.$^5$ .............................................. B05D 3/06
[52] U.S. Cl. ....................................... 427/39; 156/99; 156/145; 156/272.6; 264/1.4; 427/40; 427/255.3; 427/294; 427/316; 427/407.2; 427/419.5

[58] Field of Search ................. 427/39, 40, 255.3, 316, 427/407.2, 419.5, 294; 264/1.4; 156/99, 145, 272.6

Primary Examiner—Bernard Pianalto
Attorney, Agent, or Firm—Bruce L. Adams; Van C. Wilks

[57] ABSTRACT

The present invention relates to a color filter substrate and a color filter electrooptical device, for example, such as color liquid crystal display device having a transparent electrode over a color filter formed on an inner surface of the liquid crystal display device.

For providing the transparent electrode on the color filter, high-frequency ion plating method is used so as to improve the contacting property with an organic polymer of the color filter layer and the transparent electrode.

6 Claims, 2 Drawing Sheets

METHOD FOR MANUFACTURING A COLOR FILTER

BACKGROUND OF THE INVENTION

The present invention relates to a color filter substrate and a color electrooptical device, more particularly, to a method of manufacturing a color filter substrate and a color electrooptical device such as, for example, a color liquid crystal display device having a transparent electrode over a color filter formed on a transparent substrate.

FIG. 3 is a section showing a color liquid crystal display device of the prior art. Reference numeral 21 designates a substrate made of glass, numeral 22 a transparent electrode made of an indium-tin oxide (as will be referred to as "ITO"), and numeral 23 a color filter made of an organic polymer and a coloring material and prepared by dyeing, printing, electrodeposition or the like. The dyeing method and the printing method can dispense with the ITO of the electrode 22. Numeral 24 designates a second transparent electrode which is made of an ITO and formed to have its pattern registered with the color filter. This second transparent electrode 24 is prepared in the prior art by a sputtering method. Numeral 25 designates an opposed substrate which is formed thereover with a transparent electrode 26 of an ITO. The opposed substrate 25 is opposed to the substrate 21 to sandwich a liquid crystal 27 therebetween to constitute a multi-color liquid crystal display device. This liquid crystal display device can use the transparent electrode 24 over the color filter as a driving electrode for applying a voltage to the liquid crystal so that it can be freed from the voltage loss, which has been caused heretofore by applying the voltage through the color filter, and can apply the driving voltage directly to the liquid crystal. Thus, the liquid crystal display device has high practical values because it is suited for a drive at a low voltage.

If, however, the transparent electrode over the color filter is formed by the sputtering method of the prior art, the substrate temperature at the filming time cannot be raised to a high level due to the heat resistance because the color filter is made of an organic polymer. Thus, the process has to be accomplished at a lower temperature than that for filming over an inorganic substrate of glass or the like to deteriorate the contacting property between the formed film and the substrate. Moreover, it frequently occurs that the resistivity of the film does not drop. As a result, a defect such as separation is liable to occur, and a sufficiently low resistance cannot be obtained with a desired film thickness.

Generally, an organic polymer and an inorganic substrate such as the ITO are highly different in thermal deformation so that a displacement will easily occur at their interface when heated, if they contact merely in face-to-face relation. In the film formed by the sputtering method, the energy owned by particles reaching the color filter is relatively low so that the bond between the particles composing the film and the color filter is too weak to overcome the thermal stress at the interface. Thus, the defect such as separation, crack or the like seems to occur.

If, on the other hand, the organic polymer used is heated and filmed up to the limit of heat resistance so as to improve the contacting property, then the stress due to the thermal deformation of the color filter is easily concentrated at the film interface to cause a defect such as crack. In order to avoid this defect, an overcoat layer having a buffering action may be sandwiched between the color filter and the transparent electrode. However, it is considerably difficult for the steps, after the transparent electrode has been filmed, to satisfy the resistance to the heating treatment and the reliability at the time of an actual use. In order to improve the contacting property with the organic polymer, on the other hand, the transparent electrode is formed by an ion plating method, in which evaporation particles are ionized to make a film by a plasma beam, as disclosed in Japanese Patent Laid-Open No. 198419/1990.

This ion plating method is a means for remarkably improving the contacting property of the color film or the like to the organic polymer, but is difficult for the covering characteristics to reduce the resistivity and to provide a thin film transparent electrode having a low resistance.

SUMMARY OF THE INVENTION

In order to solve the above-specified problems, we have investigated a filming technique for forming such a film over a color film of an organic polymer and which has a good contacting property and can achieve a low resistivity. As a result, we have found out that a transparent electrode filmed by a high-frequency ion plating method, in which a substance having evaporated from an evaporation source is ionized by the high-frequency glow discharge and accelerated by a DC electric field, has a high contacting property with the color filter made of an organic polymer and sufficiently low resistivity, and that a color electrooptical device using that transparent electrode has high display quality and reliability. Here, the high-frequency ion plating apparatus is disclosed in detail in the section "High-Frequency Ion Plating Apparatus" on page 687 of Vol. 43 of APPLIED PHYSICS issued in 1974.

The present invention adapts the high-frequency ion plating method, in which an evaporated material is ionized by the high-frequency glow discharge and accelerated by a DC electric field, for providing a transparent electrode on the color filter layer made of organic polymer.

In the high-frequency ion plating method, the accelerated particles migrate with high energy into the organic polymer of the color filter layer, so that the transparent electrode film provided by a deposition of the particles takes a strong bonding status to have a high contacting force and to withstand a high thermal stress. In addition to the aforementioned action, the substrate according to the high-frequency ion plating method can be freed from any unnecessary impact from charged particles to minimize the defect of the ITO film. As a result, it seems that a homogeneous film can be easily achieved to realize the low resistivity.

DETAILED DESCRIPTION OF THE PREFERRED EMBODIMENTS

The effects of the present invention will be specifically described in the following in connection with the embodiments thereof and an example for comparison.

Embodiment 1

Figure 1:
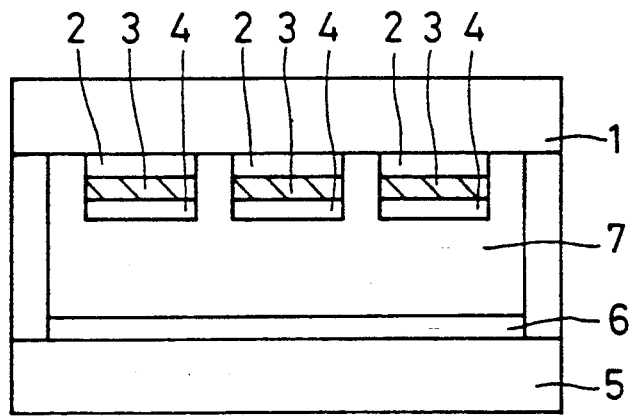
FIG. 1 shows a sectional view of an embodiment of an electrooptical device according to the present invention.

FIG. 1 is a section showing a color electrooptical device according to the present invention. Reference numeral 1 designates a substrate made of glass, and numeral 2 is an ITO electrode formed over the substrate 1. A color filter 3 is formed over the ITO electrode 2 by a applying a voltage to the ITO electrode in an electrodepositing solution, which is prepared by dispersing a polyestermelamine resin and a coloring material in water, to deposit the color filter 3 on the ITO electrode 2. Such a method of making a color filter by electrodeposition is disclosed in detail in Japanese Patent Laid-Open No. 59446/1990. Reference numeral 4 designates a second electrode which is formed over the color filter 3 by the high-frequency ion plating method. Numeral 5 designates an opposed substrate which is made of glass and formed thereover with an ITO electrode 6. Thus, the color electrooptical device is constructed by opposing the substrate 1 and the substrate 5 to each other and by sandwiching a liquid crystal 7 therebetween.

This device is manufactured in the following manner:

(1) The ITO film is deposited on the substrate 1 and is formed into a predetermined shape by photolithography to prepare the ITO electrode 2.

(2) Next, the voltage is applied to the ITO electrode 2 in the electrodepositing solution, in which the polyestermelamine resin and the coloring material are dispersed into the water, to form the color filter (which has a heat resistance of about 250° C.).

(3) Next, the ITO is deposited by the high-frequency ion plating method on the substrate which is formed with the color filter, to form the second electrode 4 having the predetermined shape and made of the ITO over the color filter by the use of the photolithography.

(4) The opposed faces of the substrate 5 formed with the ITO electrode 6 and the aforementioned substrate 1 are oriented to sandwich the liquid crystal 7 therebetween thereby to manufacture the display device, as shown in FIG. 1.

Incidentally, the aforementioned manufacture steps (1) and (2) are necessary ones in case the electrodeposited color filter is used. In case, however, the color filter is formed by the dyeing or printing method, the step (1) is not indispensable, but the color filter is formed over the substrate 1 by the dyeing method or the printing method at the step (2).

Next, one example of the high-frequency ion plating method for forming the ITO over the color filter 3 will be described in the following.

Figure 4:
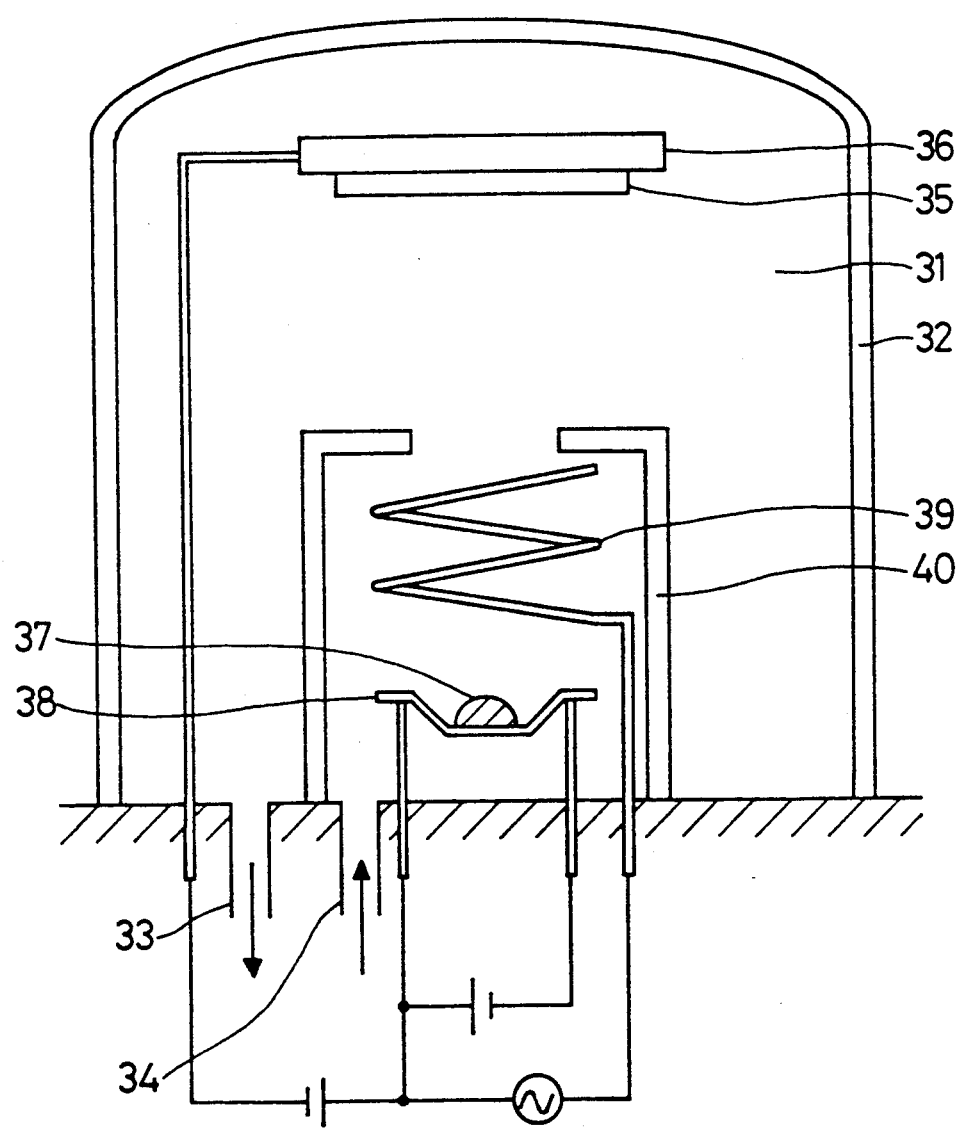
FIG. 4 shows a high-frequency ion plating apparatus used for providing a transparent electrode film on a color filter layer of the present invention.

FIG. 4 is a section showing one example of an apparatus using this high-frequency ion plating method. In the Figure, vacuum chamber 31 is held air-tight by a bell jar 32. The vacuum chamber 31 is evacuated by an evacuation line 33 including a vacuum pump. The bell jar 32 is equipped with a gas inlet 34. At the time of forming the transparent conductive film, the inside of the bell jar 32 is evacuated at first through the evacuation line 33 and is then fed through the gas inlet 34 with oxygen gas, and this oxygen gas has its partial pressure regulated to about $10^{-5}$ to $10^{-2}$ Torrs. The present embodiment is exemplified by a pressure of $1 \times 10^{-3}$ Torrs.

The bell jar 32 is equipped therein with a substrate unit composed of a substrate 35 having a color filter and a holder 36; an evaporation substrate 37 composed of 5% of tin oxide and 95% of indium oxide for forming the film; a heating boat 38 for heating and evaporating the evaporation substance 37; a high-frequency coil 39 for ionizing the evaporated particles by the high-frequency excitation; and shield 40. Moreover, a DC electric field can be applied to the holder 36 and the heating boat.

The particles are evaporated from the evaporation substance 37 by the heating to migrate in the bell jar. While passing through the high-frequency coil 39, the particles are ionized in the high-frequency excitation area which is formed in the shield 40. The ionized particles are accelerated to impinge and deposit upon the substrate face by the action of the electric field, which is applied to the substrate 35 or the holder 36, to form a cover film. At this time, the substrate can be heated to enhance the depositability. For the ion plating operation, an inert gas such as argon or helium may be confined together with the oxygen gas in the bell jar. Moreover, an auxiliary electrode can be disposed in the bell jar to correct the distribution of the electric field thereby to achieve higher film characteristics.

In the present embodiment, the substrate was heated to 200 C.° by applying high-frequency waves of 13.56 MHz to the high-frequency coil to form a transparent conductive film of ITO having a thickness of 2,000 Å, a transmissivity of 85% and a surface resistance of 8 to 10 $\Omega/\square$.

In the electrooptical device thus manufactured according to the present embodiment, the ITO electrode over the color filter had an excellent contacting property but no separation and crack at the filming time and had no resistance change, even if heated thereafter at 200° C. for 5 hours, and a sufficient contacting property maintained. Since the ITO electrode was thin and has a low resistance, moreover, the color liquid crystal electrooptical device using the ITO electrode had an excellent display quality and could be driven at a low voltage, even after it had been driven at 80° C. for 2,000 hours, without any deterioration in the electrode over the color filter.

Embodiment 2

Figure 2:
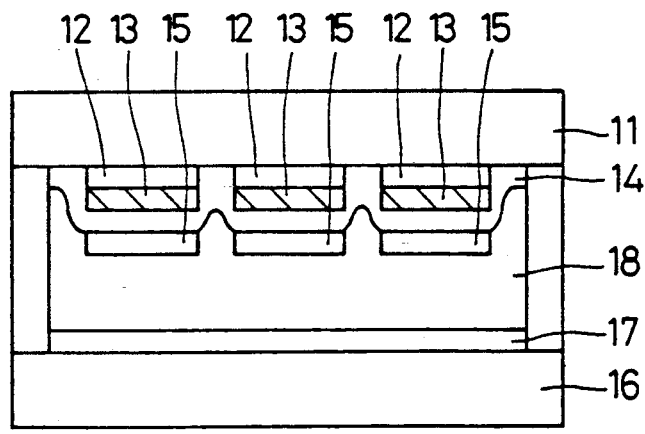
FIG. 2 shows a sectional view of another embodiment of an electrooptical device according to the present invention.

FIG. 2 is a section showing another embodiment of the multi-color display device according to the present invention. Reference numeral 11 designates a substrate made of glass, and numeral 12 designates an ITO transparent electrode, which is formed thereover by an electrodeposition with a color filter 13 made of an acrylic-melamine resin and a coloring material. Numeral 14 designates an overcoat layer which is made of an acrylic-epoxy resin for smoothing the roughness of the surface of the substrate 11 and protecting the color filter. Numeral 15 designates a second transparent electrode which is made of the ITO by the high-frequency ion plating method like the Embodiment 1. Numeral 16 designates an opposed electrode which is made of glass. After having been formed thereover with an ITO transparent electrode 17, the opposed substrate 16 is opposed to the substrate 11, and a liquid crystal 18 is sandwiched between the two substrate to manufacture the color liquid crystal electrooptical device. This electrooptical device could achieve effects similar to those of the Embodiment 1.

Embodiment 3

This Embodiment was exemplified by preparing the color filter 13 of FIG. 2 by the dyeing method, in which photosensitive gelatin was patterned by the photolithography and dyed. In this case, the ITO electrode 12 is indispensable. Then, the overcoat layer 14 was formed of a polyimide resin containing a silicone compound to manufacture a multi-color liquid crystal display device as in the Embodiment 2, to provide similar effects.

Example for Comparison

Figure 3:
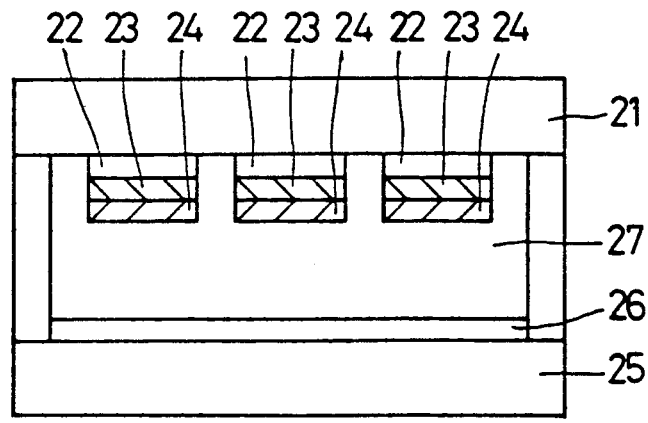
FIG. 3 shows a sectional view of an electrooptical device according to a prior art manufacturing method.

The ITO electrode 24 over the color filter of FIG. 3 was subjected to a DC sputtering at a substrate temperature of 200 C.° by using an indium-tin oxide as a target. Immediately after the filming step, the electrode was cracked thereover so that a sufficient contacting property could not be obtained.

As has been specifically described in connection with the embodiments, the process for manufacturing the color electrooptical device according to the present invention is enabled, by forming the transparent electrode over the color filter by the high-frequency ion plating method, to remarkably improve the contacting property with the color filter made of the organic polymer and the reliability to heat or the like. Moreover, it is possible to stably manufacture the color electrooptical device which is enabled to have a thin film and an electrode of low resistance and to find a suitable application to a low-voltage drive by the excellent covering characteristics.

What is claimed is:

1. A method for manufacturing a color filter comprising the steps of:
    forming a color filter made of an organic polymer on a substrate; and
    forming a transparent conductive film on the color filter by a high-frequency ion plating method, wherein the transparent conductive film is deposited from an evaporated material which is ionized by a high-frequency glow discharge and accelerated by a DC electric field in a low pressure chamber.

2. A method for manufacturing a color filter according to claim 1; wherein the color filter of an organic polymer comprises a set material of a polyester resin and a melamine resin, or a set material of an acrylic resin and a melamine resin.

3. A method for manufacturing a color filter according to claim 1; wherein the transparent conductive film is made of an indium-tin oxide and formed on the color filter by the high-frequency ion plating method with heating the substrate under 250° C.

4. A method for manufacturing a color electrooptical device comprising the steps of:
    forming a color filter made of an organic polymer on a substrate;
    forming a transparent conductive film on the color filter by a high-frequency ion plating method, wherein the transparent conductive film is deposited from an evaporated material which is ionized by a high-frequency glow discharge and accelerated by a DC electric field in a low pressure chamber; and
    forming an opposed substrate by keeping a predetermined gap with the substrate and filling liquid crystal material into the gap.

5. A method for manufacturing a color electrooptical device according to claim 4; wherein the color filter of an organic polymer comprises a set material of a polyester resin and a melamine resin, or a set material of an acrylic resin and a melamine resin.

6. A method for manufacturing a color electrooptical device according to claim 4; wherein the transparent conductive film is made of an indium-tin oxide and formed on the color filter by the high-frequency ion plating method with heating the substrate under 250° C.

* * * * *